United States Patent Office 2,878,272
Patented Mar. 17, 1959

2,878,272
ACYL PENTAALKYLGUANIDONIUM SALTS

Hans Z. Lecher, Plainfield, and Elizabeth M. Hardy, Bound Brook, N. J., assignors to American Cyanamid Company, New York, N. Y., a corporation of Maine No Drawing. Application May 21, 1956
Serial No. 585,971

6 Claims. (Cl. 260—404.5)

This invention relates to novel acyl pentaalkylguanidonium salts. More particularly, it relates to acyl pentaalkylguanidonium salts in which the acyl grouping is derived from either a saturated or unsaturated aliphatic monocarboxylic acid from 12 to 18 carbon atoms and represented by the general formula:

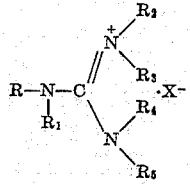

In this formula, R is an acyl radical containing from 12 to 18 carbon atoms selected from the group consisting of an aliphatic saturated monocarboxylic acid residue and an aliphatic unsaturated monocarboxylic acid residue and $R_1$, $R_2$, $R_3$, $R_4$ and $R_5$ each is a radical selected from the group consisting of methyl and ethyl and X represents an anion.

The acyl pentaalkylguanidonium salts as defined hereinbefore are powdery to waxy solid substances which are soluble in water. Surprisingly, these are stable compounds. For example, they are stable to hydrolysis in that the acyl group is not easily split off. In addition, the compounds find utility as efficient surfactants, germicides and softening agents for textiles.

The acyl pentaalkylguanidonium salts of the present invention can be prepared by causing an acyl halide to react with a pentaalkylguanidine in an inert medium. Taking as illustrative lauroyl chloride and pentamethylguanidine, the reaction may be represented by the following general equation:

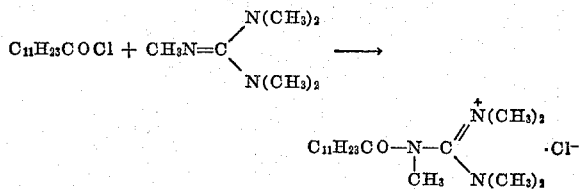

As examples of acyl chlorides or bromides which can be reacted with a pentaalkylguanidine may be mentioned lauroyl chloride, palmitoyl bromide, stearoyl chloride, oleyl chloride and linoleyl bromide.

Typically illustrative pentaalkylguanidines may be mentioned: pentamethylguanidine, pentaethylguanidine, N,N-diethyl-N′,N′,N″-trimethylguanidine, and N-ethyl-N,N′,-N′,N″-tetramethylguanidine.

The acyl pentaalylguanidonium halides can be further treated with a metal nitrate, phosphate or sulfate, such as for example, silver nitrate to replace the halide with a corresponding aforementioned anion. Alternatively, the acyl pentaalkylguanidonium halides can be reacted with a metal oxide, such as silver oxide, to form the corresponding base. The base is neutralized subsequently with a dilute acid such as for example, sulfuric or nitric and phosphoric acid to obtain the corresponding sulfate, nitrate and phosphate salts respectively.

The invention will be illustrated by the following examples, which are not intended to be limitative of the invention. The parts given are by weight unless otherwise stated.

EXAMPLE 1

*Lauroyl pentamethylguanidonium chloride preparation*

A solution of 4.4 parts lauroyl chloride in 25 parts of dry ether is added to an agitated solution of 2.6 parts of pentamethylguanidine in 35 parts of dry ether. Precipitation of the adduct starts immediately. Stirring is continued until reaction is complete. The yield is almost quantitive. The waxy solid product dissolves in water, forming a clear, soapy solution of good wetting power.

The corresponding bromide salt is prepared by substituting for the lauroyl chloride of this example the corresponding lauroyl bromide. Resultant solid is similar in properties to the guanidonium chloride.

EXAMPLE 2

*Stearoyl pentamethylguanidonium chloride preparation*

A solution of 6.0 parts of stearoyl chloride in 25 parts of dry ether is added to an agitated solution of 2.6 parts of pentamethylguanidine in 25 parts of dry ether. Precipitation of the adduct starts immediately. Stirring is continued until the reaction is complete. Resultant solid product having a melting point in the range of 94° C. to 100° C. is isolated by filtration. It dissolves in water, forming a clear, soapy solution of good wetting power.

EXAMPLE 3

The procedure of Example 2 is repeated except that 3.3 parts of pentaethylguanidine is used instead of the pentamethylguanidine reactant. Resultant solid stearoyl pentaethylguanidonium chloride having a melting point in the range of 98° C. to 110° C. is recovered.

EXAMPLE 4

*Oleyl pentamethylguanidonium chloride preparation*

A solution of 6.0 parts of oleyl chloride in 25 parts of dry ether is added to an agitated solution of 2.6 parts of pentamethylguanidine in 35 parts of ether. Precipitation starts immediately. Stirring is continued until the reaction is complete. This compound is a waxy solid, soluble in water, forming soapy solutions of good wetting power. It is also soluble in alcohol, acetone, benzene, but insoluble in ether.

The corresponding bromide salt is prepared by substituting oleyl bromide for oleyl chloride. Resultant compound is similar in properties to the chloride derivative.

EXAMPLE 5

*Preparation of stearoyl pentamethylguanidonium nitrate*

In a suitably equipped vessel, a solution of 8.6 parts of stearoyl pentamethylguanidonium chloride (prepared by the procedure of Example 2) in 100 parts of water is mixed with a solution of 3.4 parts of silver nitrate in 50 parts of water. The mixture is digested on a steam bath. Precipitated silver chloride is removed by filtration. Evaporation of the water from the filtrate leaves the corresponding nitrate salt as a solid residue. Its analysis indicates the following:

Calcd. for $C_{24}H_{50}N_4O_4$: C, 62.8; H, 10.4; N, 12.2.
Found: C, 61.5; H, 10.1; N, 12.0.

EXAMPLE 6

*Stearoyl pentamethylguanidonium sulfate preparation*

To a solution of 8.6 parts of stearoyl pentamethylguanidonium chloride in 100 parts of water is added an equivalent amount of freshly prepared silver oxide. The mixture is digested on the steam bath and the precipitated silver chloride is removed by filtration. The filtrate is next neutralized with an equivalent amount of dilute sulfuric acid. Evaporation of the solution leaves the sulfate salt as a solid residue.

The phosphate salt is prepared in a similar manner as by neutralizing the filtrate with an equivalent amount of dilute phosphoric acid.

As was noted above, compounds of the present invention are not only useful as surfactants but when so used exhibit antibacterial activity. Using the compound of Example 1 above as illustrative of the guanidonium halides of the present invention, this effect is shown in the following example.

EXAMPLE 7

Lauroyl pentamethylguanidonium chloride is tested in vitro by the spot plate agar dilution test. The medium is trypticase soy agar. The guanidonium chloride compound of Example 1 is dissolved in phosphate buffer at pH equal to about 7.0 at 200 mg. percent. The latter solution is next diluted in buffer tenfold and incorporated in the agar to give various test concentrations. The agar surfaces of the test plates are inoculated with a broth culture of a test organism and incubated for 24 hours at 37° C. Where *Past. multocida* No. 310 is used as the test organism, it was found that 1 mg. percent or less of the guanidonium compound effectively inhibits growth. However, when the well-known germicide, N-trichloromethylmercapto-4-cyclohexene-1,2-dicarboximide, known as "Captan," is substituted for the guanidonium chloride of Example 1, growth inhibition is observed at 10 mg. percent of "Captan."

Similar growth inhibition against *Strep. faecalis* Ralston as the organism and *Staph. aureus* No. 344 are observed.

We claim:

1. As a new composition of matter: an acyl pentaalkylguanidonium salt represented by the formula:

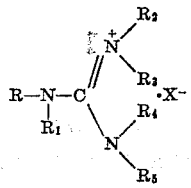

in which R represents the acyl radical containing from 12 to 18 carbon atoms selected from the group consisting of an aliphatic saturated monocarboxylic acid residue and an aliphatic unsaturated monocarboxylic acid residue, X represents an inorganic anion, and $R_1$, $R_2$, $R_3$, $R_4$ and $R_5$ each represents a radical selected from the group consisting of methyl and ethyl.

2. As a new composition of matter: lauroyl pentamethylguanidonium chloride.

3. As a new composition of matter: stearoyl pentamethylguanidonium chloride.

4. As a new composition of matter: stearoyl pentaethylguanidonium chloride.

5. As a new composition of matter: oleyl pentamethylguanidonium chloride.

6. As a new composition of matter: stearoyl pentamethylguanidonium nitrate.

References Cited in the file of this patent
UNITED STATES PATENTS

| | | |
|---|---|---|
| 2,071,484 | Wittwer et al. | Feb. 12, 1937 |
| 2,221,478 | Hill et al. | Nov. 12, 1940 |
| 2,324,354 | Bindler et al. | July 13, 1943 |
| 2,483,969 | Gajewski | Oct. 4, 1949 |
| 2,550,746 | Wohnsiedler et al. | May 1, 1951 |
| 2,583,772 | Gunderson | Jan. 29, 1952 |
| 2,589,674 | Cook et al. | Mar. 18, 1952 |
| 2,763,649 | Albrecht et al. | Sept. 18, 1956 |
| 2,778,773 | Wellman | Jan. 22, 1957 |